Nov. 13, 1923.  S. DI FELIPPO  1,473,698

ROTARY CUTTER

Filed April 19, 1923

INVENTOR.
Saverio Di Felippo
BY Alfred J. Bratton
his ATTORNEY.

Patented Nov. 13, 1923.

1,473,698

UNITED STATES PATENT OFFICE.

SAVERIO DI FELIPPO, OF TRENTON, NEW JERSEY.

ROTARY CUTTER.

Application filed April 19, 1923. Serial No. 633,304.

*To all whom it may concern:*

Be it known that I, SAVERIO DI FELIPPO, a citizen of the United States, residing at Trenton, in the county of Mercer and State of New Jersey, have invented certain new and useful Improvements in Rotary Cutters, of which the following is a specification.

This invention relates to rotary cutters and it has more particular reference to devices for cutting dough into narrow strips for making macaroni, noodles and the like.

The primary object of this invention is to provide an improved form and construction of macaroni or noodle cutter that will cut a parallel series of strips out of a flat piece of dough in a clean and sanitary manner without wastage.

With the foregoing and other objects in view as will be apparent from the following description, my invention consists in the novel construction, combination and arrangement of parts hereinafter fully described, and more specifically defined by the appended claim.

In the further disclosures of the invention reference is to be had to the accompanying sheet of drawings illustrative of one practical embodiment thereof, said drawings constituting a part of this specification, and like parts being designated by the same distinguishing characters in all the views.

Figure 1:
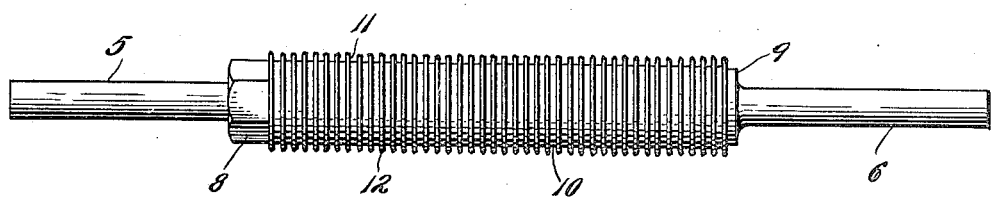
Figure 1, is a side view of my novel macaroni or noodle cutter.
Figure 2:
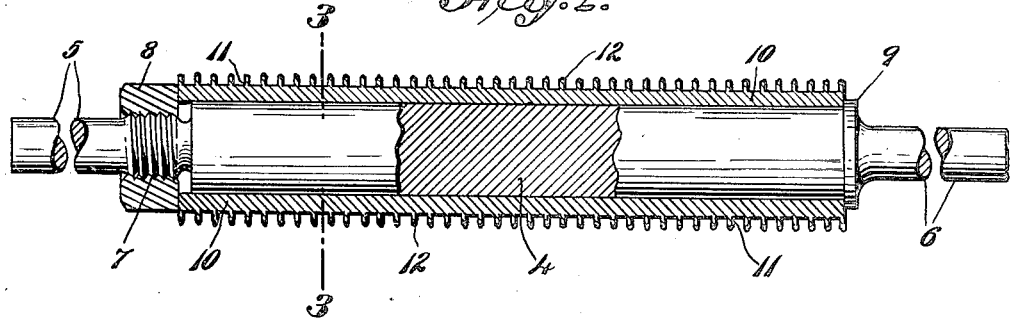
Figure 2, is a broken sectional elevation of the same drawn to an enlarged scale for the sake of clearness.
Figure 3:
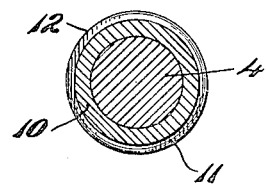
Figure 3, is a transverse section on the line 3—3 in the preceding figure.

Referring more in detail to the several views my invention comprises a roller or spindle 4 having its ends reduced to provide handles 5, 6, the former of which is screw threaded at 7 to receive a lock nut 8 for a purpose hereafter referred to. The opposed handle 6 is separated from the roller or spindle 4 by an integral collar or shoulder 9 and said spindle 4 and handles 5, 6 are formed from a piece of appropriate material not susceptible to warping or distortion. Snugly fitting the aforesaid roller or spindle 4 is a removable metal cylinder or sleeve 10 having a plurality of evenly spaced and integral peripheral ribs or cutters 11 the peripheral edges whereof are rounded at 12, and said cylinder or sleeve 10 is clamped and locked securely between the aforesaid shoulder 9 and nut 8 as will be clear from the drawings without further explanation.

Obviously the device is employed with a rolling movement over a flat piece of dough in the well known manner, and at each rotation thereof the strips will be severed into lengths with neatness, while clogging of said dough in the spaces between the ribs or cutters 11 will be prevented owing to the shallowness of said cutters and due to their integral formation in the metal cylinder 10 as a unitary structure.

By making the cylinder or sleeve 10 removable from the roller or spindle 4 it will be clear that a plurality of such cylinders 10 having integral ribs or cutters 11 of different gauge may be supplied therewith, thus adapting the device for cutting macaroni or noodles of different grades and sizes.

From the foregoing description, taken in conjunction with the accompanying drawings the advantages and usages of the invention will be readily understood without requiring a more extended explanation. Furthermore, various changes in the form, proportion, and minor details of construction may be resorted to without departing from the principle or sacrificing any of the advantages of this invention, as defined by the subjoined claim.

Having described my invention what I claim as new and desire to secure by Letters Patent, is:—

The combination of a unitary spindle having reduced extensions at each end providing handles, one of said handles being separated therefrom by a shouldered collar and the other screw threaded to receive a lock nut, and a sleeve snugly fitting the aforesaid spindle, said sleeve having equally spaced peripheral cutting ribs and being secured in place between the shouldered collar and lock nut.

In testimony whereof I affix my signature this 17th day of April, 1923.

SAVERIO DI FELIPPO.